March 14, 1961 A. J. HYATT 2,974,960
APPARATUS FOR POSITIONING AND SCANNING A TRANSDUCER HEAD OVER A GROOVELESS RECORD
Filed May 11, 1959 2 Sheets-Sheet 1

INVENTOR
ARTHUR J. HYATT
BY
Curtis, Morris & Safford
ATTORNEYS.

March 14, 1961 A. J. HYATT 2,974,960
APPARATUS FOR POSITIONING AND SCANNING A
TRANSDUCER HEAD OVER A GROOVELESS RECORD
Filed May 11, 1959 2 Sheets-Sheet 2

INVENTOR
ARTHUR J. HYATT
BY
Curtis, Morris & Safford
ATTORNEYS.

United States Patent Office 2,974,960
Patented Mar. 14, 1961

2,974,960

APPARATUS FOR POSITIONING AND SCANNING A TRANSDUCER HEAD OVER A GROOVELESS RECORD

Arthur J. Hyatt, Fort Worth, Tex., assignor to Dictaphone Corporation, Bridgeport, Conn., a corporation of New York Filed May 11, 1959, Ser. No. 812,454

7 Claims. (Cl. 274—4)

Figure 1:
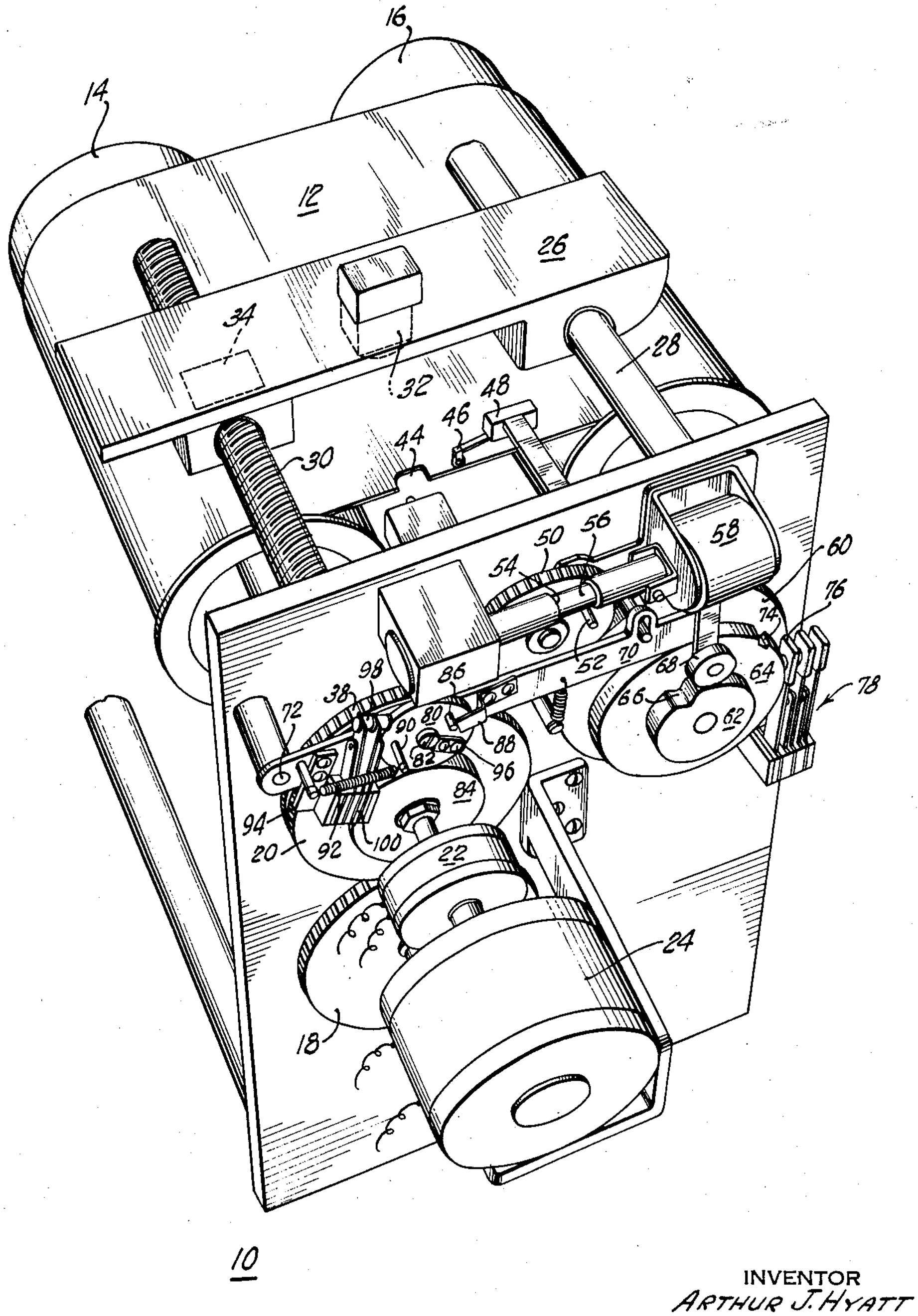

This invention relates to an improved arrangement for synchronizing the movements of a transducer head with the tracks of a grooveless phonograph record, such as a short, wide magnetic belt record used in dictating machines.

One of the most desired qualities of a dictating machine is convenience in operation and one of the most important factors in convenience is the ease with which previously dictated material can be reviewed. A short wide belt record, rather than a long thin tape, is far superior for use in dictating machines because any point in the entire recording on the belt can instantly be reviewed simply by moving the transducer head across the record to the desired position. A tape record, on the other hand, must be rewound from one reel to another to reach an earlier point on the tape and this may take a minute or more.

With the development of high quality magnetic recording materials it has become feasible to provide a dictating machine using a magnetic record. However a difficulty in making a machine of this kind which uses a magnetic belt record has been the fact that, since the record is grooveless, it is not possible to use direct mechanical engagement between record and transducer head to assure that the head follows the recorded sound tracks. Where there is a helical sound track magnetically recorded on a belt record any change in the length of the record, for example, will change the relative pitch of the track on the record from its original value. This means that if the record is then played back on a machine adjusted to drive the record at a given lineal velocity (as distinguished from rotational velocity) and to drive a transducer head across the record according to a pitch equal to the original value, the transducer head will not exactly follow the actual sound track with its altered track pitch. Faulty reproduction then ensues.

In a previously developed system which in large measure overcomes this difficulty in accurately tracing a helical sound track on a magnetic belt record, the record is stretched as an endless belt on two or more mandrels and driven at constant lineal speed past a transducer head which moves slowly in a lateraly direction across the record. If the length of the record changes slightly, its rotational speed past the head will change in proportion since it is driven at constant lineal speed. Therefore to compensate for this the lateral speed at which the transducer head is driven across the record is increased or decreased in accordance with changes in the rotational speed of the record past the head, this rotational speed being determined by one or more index marks on the record. In this way the track traced along the record by the head coincides within predetermined limits with a signal track on the record. During recording, the transducer is moved across the record with an average velocity having a fixed ratio to the rotational, rather than the lineal speed of the record past the head. During playback, the head is moved at the same fixed ratio; accordingly the track pitch of the head during recording, which of course becomes the pitch of the sound track, and the track pitch of the head during playback are kept very nearly equal.

In the above system, the passage of an index mark carried on the belt record past a stationary point is used to measure the rotational speed of the record. Failure to detect passage of the index mark, however, would result in stopping the lateral feed of the transducer head and therefore, even though the machine is otherwise operating properly and the record is being driven past the transducer head, the signal to be recorded will be lost. This type of failure is particularly troublesome because the record will still be rotating and the operator of the machine perhaps may not notice that the head is not moving and so may continue dictating, all to no avail. To guard against this difficulty the present invention provides a fail-safe arrangement which allows the machine to continue to record even though its synchronizing system has failed.

In accordance with the presence invention, in one specific embodiment thereof, a dictating machine using a short, wide magnetic belt record and having a transducer head synchronizing system of the kind described above, is provided with a safety mechanism which disables the synchronizing system in the event of failure. This mechanism includes a cam wheel which is set in motion at the beginning of each synchronizing interval and continues to rotate during the interval. If within a predetermined length of time the synchronizing system properly carries out its operation, then this cam wheel is returned to its initial position. On the other hand, if the synchronizing system fails to function within the allotted time, then the cam wheel, continuing its rotation, actuates an electric safety switch which disconnects the synchronizing system entirely and keeps its disconnected until the trouble is cleared and the safety switch manually reset. The actuation of the safety switch also lights a warning signal on the control panel of the machine. Thereafter even though the automatic synchronizing system is turned off, it will of course still be possible to operate the machine and record dictation without inadvertently losing it. The dictation so recorded can be played back on the machine by making manual adjustments, when required, to compensate for any tracking errors between the transducer head and the helical signal track on the record.

Figure 2:
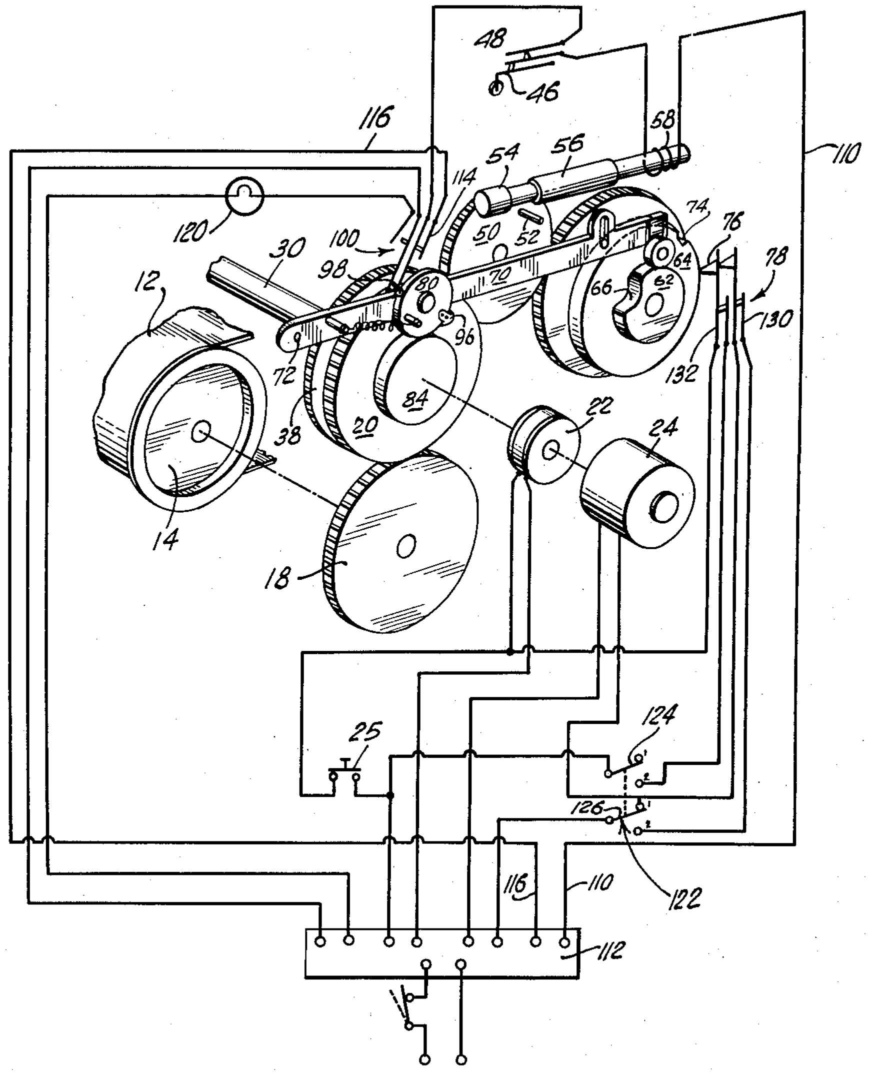

A better understanding of the invention together with a fuller appreciation of its many advantages will best be gained from a study of the following description given in connection with the accompanying drawings in which:

Figure 1 is a perspective view of part of a dictating machine incorporating features of the invention, the machine being shown with some parts broken away; and Figure 2 is a schematic view, somewhat enlarged, of the synchronizing mechanism of the machine with its associated cam wheels and the electric circuit for turning off the synchronizing system in the event of failure.

Figure 1 shows a portion of a dictating machine 10 wherein a wide short magnetic belt record 12 is stretched between and supported on a drive mandrel 14 and a parallel idler mandrel 16. The drive mandrel is connected from its shaft through the gears 18 and 20 to an electrically operated clutch 22 and thence to an electric motor 24. During operation of the machine, motor 24 runs continuously and clutch 22 is actuated as desired to start and stop drive mandrel 14 from a remote switch, for example, a pushbutton switch 25 (see Figure 2) located on a hand microphone unit (not shown) connected to the machine.

Positioned on top of the record and adapted to move slowly transverse to it while the record is rotated is a carriage 26. This carriage is supported on one side by the guide rod 28 and is supported and driven on the other side by the feed screw 30. Extending down from the carriage against the record is a conventional transducer head 32 which serves both for recording and for playback. To permit the carriage to be disengaged from the feed screw and shifted laterally, there is provided a feed nut 34 which in known manner can be moved into or out of engagement with the feed screw.

In normal operation, the feed screw is rotated slowly by means of a gear 38 during most but not quite all of a revolution of record 12. Gear 38 in turn is driven by frictional engagement against the face of gear 20 with which it is coaxial.

Gear 20 always rotates when clutch 22 is energized though, as will appear, gear 38 is at times held stationary and caused to slip relative to gear 20. Holding gear 38 stationary while gear 20 rotates stops the lateral travel of head 32 and during this stopped interval, which is very brief, record 12 continues to rotate. At the end of this interval when the record completes a full revolution, as marked by a notch 44 in the side edge of the record when passing under an arm 46 of a switch 48, gear 38 is again released and head 32 resumes its slow lateral travel which continues until near the end of the next record revolution, and so on. In this manner the head progresses across the record tracing out an almost, but not exactly, helical signal track which is oriented on the record in accordance with the position of notch 44. When the record is played back on this or on another machine like it, the transducer head will follow a track determined by notch 44 and this track will lie within close limits of the actual signal track even though the record slips slightly on the drive mandrel during rotation or even though the record has shrunk or stretched slightly.

Shortly before the record has completed a given revolution, for example, at about 95% of a full turn, the rotation of gear 38 is arrested. This is accomplished as follows. Meshing with gear 38 is an idler gear 50 which carries a pin 52 projecting outward. Gear 50 rotates counter-clockwise and in rotating from the position shown moves pin 52 upward and around against a shoulder 54 of a plunger 56. The latter is normally held against movement to the left by a solenoid 58, the plunger being held sufficiently far to the right so that pin 52 will come to a stop against it. When this happens, gears 50 is arrested and thus will cause gear 38 and feed screw 30 to stand still until the solenoid plunger is released. Normally, solenoid 58 is almost immediately thereafter deenergized by switch 48 when the notch 44 moves under the arm 46, so that the gear 38 and feed screw 30 will be released to again start the head 32 moving across the record.

Meshed with idler gear 50 is another gear 60 which rotates in unison with gear 50. The outer face of gear 60 carries a small cam 62 and a larger cam 64. Cam 62 has a cylindrical periphery except for a notch 66 which cooperates with a cam wheel 68. The latter is carried on the free end of a beam 70 the left end of which is pivoted at 72 to the frame of machine 10. The larger cam 64 is likewise cylindrical except for a notch 74 which cooperates with a spring finger 76 of a multiple switch 78.

When gear 60 and cams 62 and 64 have rotated slightly farther clockwise from the position shown in the drawings, cam wheel 68 drops into notch 66 and lowers the right end of beam 70. This occurs at the same time that pin 52 of gear 50 comes against shoulder 54 and stops. Thereafter, assuming of course that clutch 22 continues to be energized, belt record 12 continues to rotate while the transducer head carriage is stationary. To safeguard against the carriage being left in this stopped condition when it should be moving, i.e. after the record notch 44 has passed switch arm 46 and the record begins a new revolution, the amount of rotation of gear 20 occurring while gear 38 is stopped is measured. If this amount exceeds a given value, then solenoid 58 is turned off, and left off. This releases pin 52 and allows the machine thenceforth to operate without automatic synchronizing.

This disabling of the synchronizing mechanism is accomplished as follows. When cam wheel 68 drops into notch 68 it lowers the free end of beam 70 and the beam carries down with it a cam wheel 80 which is pivotally mounted on the beam at 82 near its pivoted end 72. Wheel 80 has a diameter such that when the beam is lowered the wheel is able to roll in contact with another wheel 84 fixed on the outer face of gear 20. Cam wheel 80 carries a first short projecting pin 86 which, in the position shown, abuts against a finger 88 fixed to beam 70 to limit the clockwise rotation of wheel 80. This wheel also carries a second, longer pin 90 to which is attached the forward end of a light tension spring 92. The rear end of this spring is fixed at 94 to beam 70 and tends to rotate cam wheel 80 clockwise to the limit shown. However, when this wheel is lowered into contact with wheel 84, it begins to rotate counter-clockwise to a final limit position determined by the abutment of pin 90 beneath finger 88.

The time required for wheel 80 to rotate to its counter-clockwise limit is greater than the time during which gear 50 normally is held stopped and during which beam 70 is down. If the synchronizing mechanism including switch 48 is working properly, solenoid 58 will be momentarily de-energized to permit gear 50 to resume rotation, which in turn will cause notch 66 in smaller cam 62 to rotate beyond wheel 68 thus moving the free end of beam 70 up. This will raise cam wheel 80 out of contact with wheel 84 and permit the former, before reaching its counter-clockwise limit, to be returned by spring 92 to the clockwise limit as shown.

If there is a failure of the synchronizing mechanism wheel 80 will be rotated to its counter-clockwise limit at which point a cam plate 96 carried by it bears against a spring finger 98 of a switch 100 mounted on beam 70. The actuation of switch 100 by cam plate 96 de-energizes solenoid 58 which frees gear 38 for rotation and permits beam 70 to return to its upper position. Cam wheel 80 will be lifted out of contact with wheel 84, and will be held in position by the toggle action of spring 92, the forward end of which on pin 90 is above the line of centers of pin 94 and pivot 82. To prevent cam wheel 80 from rubbing against wheel 84 while in this condition, the rim of cam wheel 80 is flattened slightly at the place opposite wheel 84. Cam wheel 80 can be reset to the position shown in Figure 1 by manually rotating it clockwise.

The mechanical and electrical elements of machine 10 which perform the synchronizing and disabling operations described above are shown schematically in Figure 2. Synchronizing switch 48 which cooperates with belt record 12 is normally closed but is adapted to be momentarily opened when arm 46 drops into notch 44 as the record passes. One side of switch 48 is in series with solenoid 58 which is connected through a lead 110 to a power supply 112. The other side of switch 48 is connected in series with a normally closed contact 114 of switch 100. The other side of this contact is connected by a lead 116 to supply 112.

Switch 100 also has a second contact 118 normally open, which when the switch is actuated by wheel 80, and contact 114 open, closes and energizes a panel lamp 120 to indicate visually that the automatic synchronizing circuit has been disabled.

At the completion of recording or playback, the feed screw of machine 10 and belt record 12 are automatically rotated to an index position and stopped. With the drive mechanism in index position, the record can be removed and a new one placed on the machine at the beginning of a cycle of the synchronizing mechanism rather than in the middle, for example.

For this purpose, when a record has been completely filled with recording and it is time to change it, the hand microphone unit (not shown) of machine 10 is returned to a cradle switch, represented by a double-pole double-throw switch 122 in Figure 2. This switch when subjected to the weight of the microphone unit resting upon it is reversed, i.e. moved from position 1 in which it is shown in Figure 2 to position 2. With this reversal of switch 122, the machine including clutch 22 will automatically be run to a position determined by the dropping of finger 76 of switch 78 into notch 74 of the larger cam 64 and then stopped. It will stop just at the beginning of a synchronizing cycle and this will leave feed screw 30 and carriage 26 in indexed position.

To be sure that the machine will continue to run as far as the index position in the event that cradle switch 122 is moved to position 2 at an instant when notch 74 is not beneath finger 76, switch 122 has a contact 124 which bypasses push button switch 25 to independently energize clutch 22. Similarly, switch 122 has a contact 126 which in position 1 as shown in Figure 2 energizes motor 24 from supply 112, which in position 2 it energizes the motor only so long as a contact 130 of switch 78, in series with it, remains closed. Contact 130 and another contact 132 of switch 78 which is in series with contact 124, stand closed until finger 76 drops into notch 74, whereupon they both open. Then both the clutch and motor are de-energized and the machine stops in index position.

The above description of the invention is intended in illustration and not in limitation thereof. Various changes may occur to those skilled in the art and these may be made without departing from the spirit or scope of the invention as set forth.

I claim:

1. A synchronizing and safety system for a dictating machine comprising a drive mandrel which is adapted to drive an endless belt record by frictional engagement and at constant lineal speed, means to laterally scan a transducer head slowly across the record as it moves longitudinally past the head, synchronizing means acting at intervals to stop the lateral movement of said head while said record continues to rotate a short distance, and safety means responsive to the condition of said synchronizing means to prevent said synchronizing means from operating in the event said head is stopped for too long a time while the record moves longitudinally.

2. The machine as in claim 1 in further combination with index means for stopping the record in an index position relative to said head, said index means comprising an electric switch to energize said drive mandrel and said scanning means, said index means being controlled by said synchronizing means.

3. In a synchronized dictating machine of the character described, at least one record supporting mandrel which is adapted to be driven, a belt record engaged upon said mandrel, said record having an index mark at a point along its length, motor means connected to said mandrel and adapted to rotate it at substantially constant speed, a feed screw, a record head adapted to be driven slowly across said record by said feedscrew, a friction clutch connected between said motor means and said feed screw, electrically operated stop means for periodically stopping said feed screw while said motor means continues to run, a switch mounted adjacent said record for sensing said index mark and for controlling said stop means, and time delay means actuated by said stop means in case said switch fails to actuate it within a given time, whereby said machine can continue to operate without synchronization.

4. The machine as defined in claim 3 wherein said stop means includes a gear driven in synchronism with said feed screw, a solenoid adapted to engage a portion of said gear when it rotates to a point and to hold said gear and prevent rotation of said feed screw, said solenoid being normally energized in series with said switch, said switch being momentarily opened by the passage of said index mark to de-energize said solenoid and release said feed screw, said time delay means including a cam wheel adapted to be driven from a starting position by said motor means when said feed screw is held, a second switch adapted to be actuated by said cam wheel after a predetermined amount of rotation thereof, said second switch being connected when actuated to disable said solenoid and to permit said feed screw to rotate, and reset means for returning said cam wheel to said starting position in the event said feed screw is released before said second switch is actuated.

5. The machine as in claim 4 wherein said reset means includes a toggle-action spring which normally urges said cam wheel to starting position but which when said wheel actuates said second switch holds said wheel against said second switch.

6. The machine as in claim 5 wherein said cam wheel is carried on a pivoted cantilever beam the free end of which is engaged by a member driven by said gear, said member being adapted to raise and lower said beam to move said cam wheel into or out of driving engagement with said motor means.

7. A synchronizing and safety system for a belt record machine using magnetic belt records and the like, said system comprising a drive mandrel which is adapted to drive an endless belt record longitudinally by frictional engagement and at constant linear speed, a transducer head, carriage means to laterally move said head slowly at normal speed in a transverse direction across said record as it rotates longitudinally past said head, synchronizing means acting at intervals on said carriage means to change the lateral speed of said head for a short time during a revolution of said belt record according to the position of said head relative to said record, and safety means responsive to the failure of said synchronizing means to defeat the action thereof and to permit said carriage means to operate at normal speed.

No references cited.